Nov. 8, 1960 N. SCHINK ET AL 2,959,501
SILICON SEMICONDUCTOR DEVICE AND METHOD OF PRODUCING IT
Filed Jan. 29, 1958
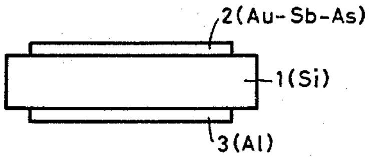

United States Patent Office 2,959,501

Patented Nov. 8, 1960

2,959,501

SILICON SEMICONDUCTOR DEVICE AND METHOD OF PRODUCING IT

Norbert Schink, Erlangen, and Adolf Herlet, Pretzfeld, Germany, assignors to Siemens-Schuckertwerke Aktiengesellschaft, Berlin-Siemensstadt, Germany, a corporation of Germany Filed Jan. 29, 1958, Ser. No. 711,967

Claims priority, application Germany Feb. 5, 1957

7 Claims. (Cl. 148—1.5)

Our invention relates to semiconductor devices, such as rectifiers or transistors, whose semiconductor body consists of substantially monocrystalline silicon, and is an improvement over the device and method disclosed and claimed in the copending application of Herbert Patalong, Serial No. 657,631, filed May 7, 1957, now Patent No. 2,898,528, assigned to the assignee of the present invention. More specifically, therefore, our invention concerns semiconductor devices in which the silicon crystal is fusion-joined with a contact electrode consisting of a gold-antimony alloy with about .2% to about 5% antimony.

It has been observed, particularly on transistors, that many such gold-antimony contacts, made of thin foil, exhibit faulty alloying spots, or "warts." All of those transistors that, when checked after completion of the alloying process, showed an excessively low peak inverse (blocking) voltage and on which the alloyed boundary zone between silicon and gold alloy was laid bare by etching, exhibited such warts. Although the gold-antimony alloy was supposed and believed to always have the same composition, some of the supplies resulted in almost 100% good transistors while others resulted almost entirely in substandard objects; and, for a long period of time, no cause could be ascertained for the discrepant behaviour.

It is an object of our invention to eliminate such defects.

In the course of comprehensive research, we came to suspect, and have ascertained reliably, that the wart formation was prevented or reduced to a great extent whenever the gold-antimony alloy was contaminated by a trace of arsenic; and we now ascribe this effect to the better wetting of the silicon surface by the arsenic-containing alloy.

Arsenic, being an element from the fifth group of the periodic system, has been known as a donor substance for the n-doping of the fourth-group semiconductor elements, germanium and silicon. But an addition of arsenic has not been used in metal electrodes because the ternary alloys of silicon, arsenic and suitable contact metal, such as gold, are brittle even if the arsenic content is only some one-hundredth of one percent of the gold content. Hence, the use of arsenic as an alloying component in electrode metal for the contacting of silicon monocrystals has not heretofore resulted in useful electric semiconductor devices and has heretofore generally been rejected as detrimental.

Our invention therefore is based upon the discovery that if traces of arsenic in properly rated quantity are present in a gold-antimony alloy, and this composition is caused to diffuse into, and form an alloy together with, a silicon crystal body, the presence of arsenic under such conditions is not detrimental but rather improves the formation of the bonding alloy so as to avoid the above-mentioned faults.

The electrode alloy of gold and cadmium thus provided with admixed arsenic contains 0.2 to 5% antimony, the remainder being gold plus the quantity of arsenic mentioned presently. We found that reliable results require a minimum arsenic content of about $10^{-3}$% relating to the total weight of the gold-antimony alloy, because otherwise an appreciable wetting of the silicon, and hence the desired improvements, are not secured, particularly when applying only the preferred moderate pressure of less than 1 kg./cm.$^2$ upon the electrode material during the silicon-metal alloying (diffusion) process. On the other hand, we found that an arsenic content of about $10^{-1}$% relating to the total weight of the alloy, represents an upper limit because up to that amount the desired effect is obtained to a satisfactory degree, whereas no further improvement by increasing the arsenic content can be ascertained. Furthermore, a too-high arsenic content may entail the danger that the finished gold alloy after cooling can hardly be rolled down to a thin foil, or that the fully contacted silicon device, after cooling, shows fissures or cracks due to excessive brittleness.

We found that a particularly favorable electrode composition contains about 1% antimony and in the neighborhood of .01% arsenic, the remainder being all gold.

We prefer producing the electrode composition by first preparing a pre-alloy only from antimony and arsenic. For this purpose, the proper amount of arsenic is admixed to a melt of high-purity antimony. Thereafter the resulting Sb-As alloy is admixed to the proper quantity of molten gold. This may be done by first adding the Sb-As pre-alloy to the melt of a smaller gold quantity than ultimately desired, and then stepwise increasing the gold content by preparing one or more additional melts. When the final alloy is thus reached, it is to contain the desired proportion, preferab'y 99% gold and 1% composed of antimony and the predetermined trace of arsenic.

The arsenic-containing gold-antimony alloy thus produced can be rolled down to foil thickness of 0.05 mm. or less. In the form of such a foil, the contact-electrode metal can readily be handled for alloying and fusion-joining it with the monocrystalline body of silicon.

The alloying process proper, that is, the joining of the electrode with the silicon body by formation of a diffusion alloy at the boundary zone, can be effected by assembling the disc-shaped silicon bodies on both sides with electrode foils located in face-to-face area contact therewith. Any desired carrier plates may also be assembled by placing them onto the foil electrodes. The entire assembly is placed between pressure plates, for instance of graphite, and is clamped between these plates while being heated to a temperature between about 700 and 800° C. for a few minutes. This suffices to produce the desired alloyed fusion joint between the silicon body and electrode foil according to the invention. Usually 5 to 10 minutes are satisfactory.

Another method of joining the electrode foils with the silicon body is to embed the silicon-electrode assembly in a mass of inert powder, for example of graphite, and then compressing the powder under moderate pressure of approximately 1 kg./cm.$^2$ or less, while applying heat to the bedding material with the embedded assembly to maintain a temperature between 700 and 800° C. for a sufficient time, usually in the order of a few minutes, to produce the diffusion-alloy bond. The latter method is more fully described in the copending application of R. Emeis, Serial No. 637,029, filed January 29, 1957, and assigned to the assignee of the present invention.

Illustrated on the drawing, by way of example, is a silicon rectifier made according to the invention.

The rectifier comprises a monocrystalline semiconductor body 1 of p-conducting silicon, shaped as a flat cylinder of approximately 0.4 mm. thickness and a diameter of approximately 10 mm. Joined with the top surface of the silicon crystal is an electrode 2 of gold foil containing approximately 99% gold, approximately 1% antimony, and a trace of arsenic amounting to about 0.01%. The foil 2 has a thickness of about 0.05 mm. and a diameter of approximately 9 mm. Joined with the bottom surface of the silicon body 1 is an electrode of aluminum having a foil thickness of approximately 0.05 mm. and a diameter of approximately 9 mm. Both electrodes are fusion-joined with the silicon body by one of the methods described above, so that an alloyed merger zone exists between each electrode and the semiconductor body, the alloy penetrating and diffusing somewhat into the silicon body. A barrier layer is formed in the boundary zone between the gold-alloy electrode 2 and the silicon body 1 so that the device has asymmetrical conductance.

A gold-antimony-arsenic alloy according to the invention may also be used for producing a barrier-free junction. In this case, the silicon body must have n-type conductance. It will also be understood that various other metals, forming barrier-free contacts may be used as counter-electrode instead of the aluminum foil 3.

We claim:

1. The method of producing an electric semiconductor device having a substantially monocrystalline silicon body and an electrode on said body, which comprises forming an alloyed composition of gold, antimony and a trace of arsenic in amounts between about 0.2 and 5% antimony and about $10^{-3}$ to about $10^{-1}$% arsenic, the remainder being substantially all gold; and alloying the composition together with the silicon body to form an area fusion joint.

2. In the method according to claim 1, said composition containing about 99% gold, the remainder of about 1% consisting of antimony and arsenic.

3. The method of producing an electric semiconductor device having a substantially monocrystalline silicon body and an electrode on said body, which comprises forming an alloyed composition of gold, antimony and a trace of arsenic in amounts between about 0.2 and 5% antimony and about $10^{-3}$ to about $10^{-1}$% arsenic, the remainder being substantially all gold, producing a foil from said composition, placing the foil into face-to-face contact with the silicon body under contact-maintaining pressure, and applying heat so as to alloy the composition together with the silicon body.

4. The method of producing an electric semiconductor device having a substantially monocrystalline silicon body and an electrode on said body, which comprises forming an alloyed composition of about 99% gold, about .001 to about .1% arsenic, the remainder being substantially all antimony, rolling the composition down to foil thickness of not more than .05 mm., placing the foil into face-to-face contact with the silicon body under contact-maintaining pressure, and applying heat so as to alloy the composition together with the silicon body.

5. The method of producing an electric semiconductor device having a substantially monocrystalline silicon body and an electrode on said body, which comprises forming an alloyed composition of gold, antimony and a trace of arsenic in amounts between about 0.2 and 5% antimony and about $10^{-3}$ to about $10^{-1}$% arsenic, the remainder being substantially all gold; producing a foil from said composition, placing the foil into face-to-face contact with the silicon body and applying pressure sufficient to maintain contact but not more than about 1 kg./cm.$^2$, heating the silicon body together with the contacting foil under said pressure at a temperature between about 700 to 800° C. for a sufficient time to alloy the composition together with the silicon body to obtain a fusion joint.

6. An electric semiconductor device, comprising a semiconductor body of substantially monocrystalline silicon, and an electrode foil fusion joined with said silicon in area contact therewith and consisting of a gold-antimony alloy containing about .2 to 5% antimony and a trace of about $10^{-3}$ to $10^{-1}$% arsenic.

7. An electric semiconductor device, comprising a semiconductor body of substantially monocrystalline silicon, and an electrode foil fusion joined with said silicon in area contact therewith and consisting of about 99% gold, .001 to .1% arsenic, the remainder being antimony.

References Cited in the file of this patent

UNITED STATES PATENTS

| | | |
|---|---|---|
| 2,782,492 | Frost | Feb. 26, 1957 |
| 2,793,420 | Johnston et al. | May 28, 1957 |
| 2,805,370 | Wilson | Sept. 3, 1957 |
| 2,811,682 | Pearson | Oct. 29, 1957 |